C. K. McMILLIN.
SUPPORT FOR AUTOMOBILE BEDS.
APPLICATION FILED JUNE 1, 1914.
1,136,885.
Patented Apr. 20, 1915.
2 SHEETS—SHEET 2.
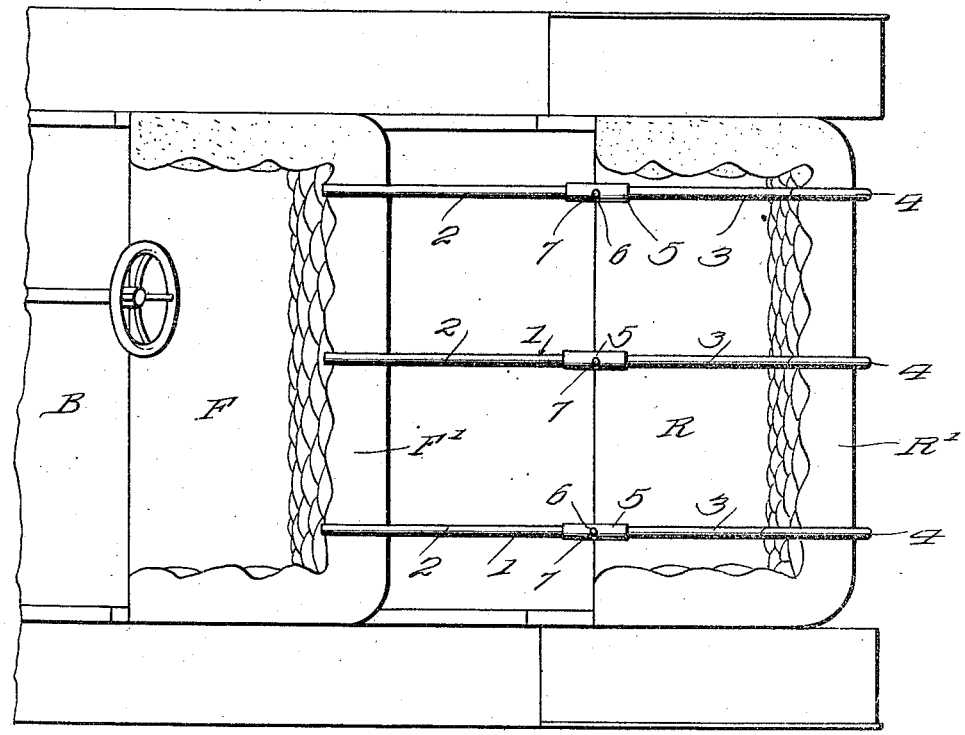
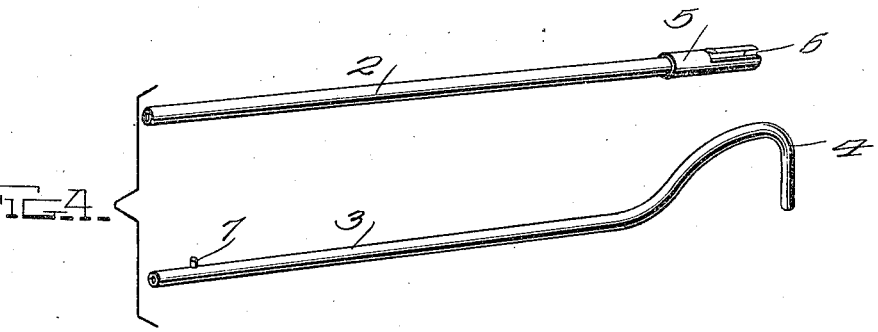
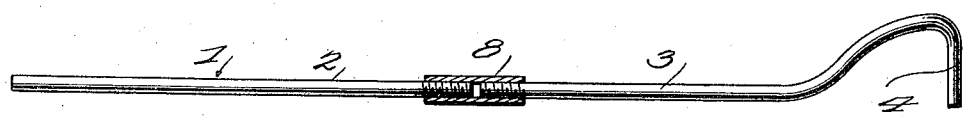
Inventor
C. K. McMillin.
By H. B. Willson & Co.
Attorney
Witnesses

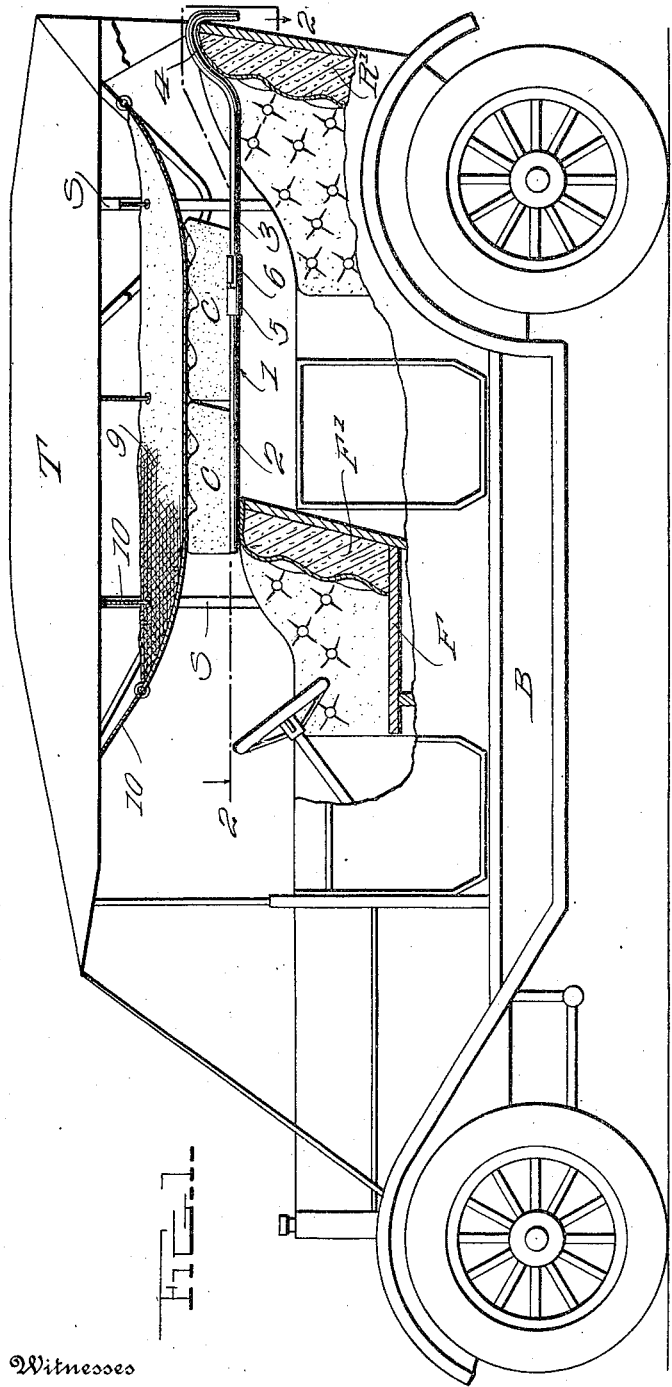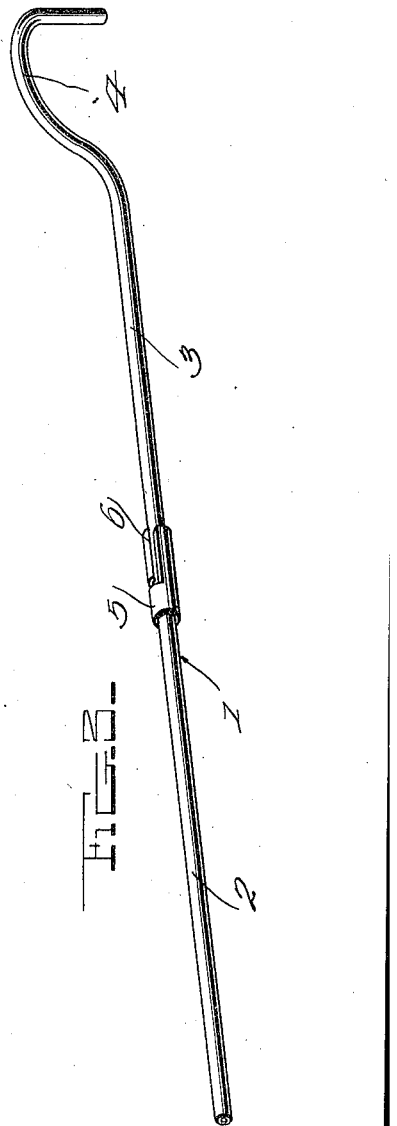

UNITED STATES PATENT OFFICE.

CLIFFORD K. McMILLIN, OF BELLINGHAM, WASHINGTON.

SUPPORT FOR AUTOMOBILE-BEDS.

1,136,885.  Specification of Letters Patent.  Patented Apr. 20, 1915.

Application filed June 1, 1914. Serial No. 842,244.

*To all whom it may concern:*

Be it known that I, CLIFFORD K. McMILLIN, a citizen of the United States, residing at Bellingham, in the county of Whatcom and State of Washington, have invented certain new and useful Improvements in Supports for Automobile-Beds; and I do declare the following to be a full, clear, and exact description of the invention, such as will enable others skilled in the art to which it appertains to make and use the same.

My invention relates to improvements in beds and more particularly to those which are designed for use in connection with automobile bodies.

The primary object of the invention is to provide a device of this character which is so constructed as to allow the cushions, from the seats of the vehicle to be supported above the backs of said seats, a sling being swung above said cushions and resting thereon at its intermediate portion.

A secondary object of the invention is to construct supporting means for said cushions in such a manner as to allow the same to be readily stored within the vehicle when not in use.

A still further object of the invention is to construct the entire device in the most simple manner consistent with its proper operation.

With these objects in view, the invention resides in certain novel features of construction and combination herein described and claimed and shown in the drawings wherein:

Figure 1 is a longitudinal section through a portion of an automobile body showing the application of my invention thereto; Fig. 2 is a horizontal section taken on the plane of the line 2—2 of Fig. 1 and showing more particularly the disposition of the supporting rods; Fig. 3 is a perspective view of one of the rods, the sections thereof being assembled; Fig. 4 is a similar view with the parts disassembled; and Fig. 5 is a side elevation of one of said supporting rods showing an internally threaded sleeve in section, said sleeve constituting the connection between the sections of the rod.

In the accompanying drawings, I have shown portions of an automobile body B, which includes front and rear seats F and R having the usual backs F' and R', the rear back R' being of greater height than the back of the front seat as is common in devices of this character. In the embodiment illustrated, the body B is provided with a suitable top T which is attached thereto by means of the usual supports S. The parts so far described, form no part of the present invention and are merely illustrated for disclosing its application.

For the purpose of allowing a comfortable bed to be erected within the body B, I have provided a number of spaced longitudinal bars 1, which are adapted to be supported by the backs of the front and rear seats, said bars being formed in front and rear sections 2 and 3, said sections 3 having their rear ends formed into arches 4 which are adapted to overlie the back of the rear seat as clearly shown in Fig. 1. The sections 2 and 3 may be united by means of a sleeve 5 which is rigidly secured to one of the sections and is adapted to receive the contiguous end of the remaining section, said sleeve being provided with a bayonet slot 6 for the reception of the pin 7 on the remaining section. This form of connection is illustrated in Figs. 1 to 4 inclusive.

In Fig. 5, I have illustrated a common form of connection which consists of an internally threaded sleeve or coupling 8, the meeting ends of the front and rear sections being externally threaded for engagement therewith.

After the bars 1 are in position, the cushions C are removed from the front and rear seats and positioned transversely on said bars, these cushions forming a support for the backs, shoulders and hips of the persons lying thereon, while their heads and feet are supported by a flexible sling 9 which is provided with a number of straps or cables 10 by means of which it may be attached to the supports S of the top. When this sling is employed, its intermediate portion rests upon the cushions C, while its opposite ends and sides are supported by the elements 10.

From the foregoing description, taken in connection with the accompanying drawings, it will be seen that I have produced an extremely simple device for carrying out the objects of the invention, yet one which will effectually perform its functions and which may be readily carried within the vehicle body.

In storing the device, the sections of the bars 1 are disconnected and preferably placed beneath the rug of the body, while the sling 9 is folded and placed beneath one of the cushions.

Having thus described my invention, what I claim is:—

The combination with a two seated vehicle body having a supported top thereover, of a number of spaced longitudinal bars overlying the backs of the seats and each having one end formed into a back engaging arch, a pair of cushions arranged transversely on the bars and a flexible sling resting at its intermediate portion on said cushions and having attaching means connected to the supports of said top.

In testimony whereof I have hereunto set my hand in presence of two subscribing witnesses.

CLIFFORD K. McMILLIN.

Witnesses:
W. H. LAWSON,
P. E. HEAL.